(12) United States Patent
Cohen

(10) Patent No.: US 7,048,372 B1
(45) Date of Patent: May 23, 2006

(54) PRIMARY EYEGLASS LENSES MAGNETICALLY MOUNTABLE TO A FRAME

(76) Inventor: Haim Cohen, Rietgors 173 B, 2991 MP, Barendrecht (NL)

( * ) Notice: Subject to any disclaimer, the term of this patent is extended or adjusted under 35 U.S.C. 154(b) by 0 days.

(21) Appl. No.: 10/979,906

(22) Filed: Nov. 1, 2004

(51) Int. Cl.
*G02C 1/04* (2006.01)

(52) U.S. Cl. .................. 351/103; 351/44; 351/106; 351/110

(58) Field of Classification Search ............ 351/44, 351/47, 48, 57, 58, 103–110
See application file for complete search history.

(56) References Cited

U.S. PATENT DOCUMENTS

| | | | | |
|---|---|---|---|---|
| 716,194 | A | 12/1902 | Conn | 351/57 |
| 2,159,710 | A | 5/1939 | Reichert | |
| 2,737,847 | A | 3/1956 | Tesauro | 351/57 |
| 4,196,981 | A | 4/1980 | Waldrop | 351/86 |
| 4,973,148 | A | 11/1990 | Gazeley | 351/47 |
| 5,367,344 | A * | 11/1994 | Fuchs | 351/41 |
| 5,416,537 | A | 5/1995 | Sadler | 351/47 |
| 5,568,207 | A | 10/1996 | Chao | 351/57 |
| 5,642,177 | A | 6/1997 | Nishioka | 351/47 |
| 5,737,054 | A | 4/1998 | Chao | 351/47 |
| 5,880,805 | A | 3/1999 | Naessens et al. | 351/57 |
| 6,012,811 | A | 1/2000 | Chao et al. | 351/47 |
| 6,053,611 | A | 4/2000 | Ku | 351/47 |
| 6,474,810 | B1 | 11/2002 | Ng | 351/47 |
| 6,488,372 | B1 | 12/2002 | Park | 351/47 |
| 6,585,370 | B1 * | 7/2003 | Zelman | 351/103 |
| 6,592,220 | B1 * | 7/2003 | Cheong | 351/106 |
| 6,786,593 | B1 * | 9/2004 | Zelman | 351/103 |

FOREIGN PATENT DOCUMENTS

| | | |
|---|---|---|
| CA | 2.276 699 | 12/2000 |
| CA | 2.285.142 | 4/2001 |

* cited by examiner

*Primary Examiner*—Huy Mai
(74) *Attorney, Agent, or Firm*—Michael I Kroll

(57) ABSTRACT

Apparatus 10 for modular eyeglasses having a plurality of lens members 14 that can be selectively mounted to a frame member 12. The frame member 12 has the typical temples 16 and a crossbar 18 with an interdisposed bridge 20. The bridge 20 is formed of pad arms and nose pads 36 depending from a mounting having a magnetic element 22 fixed within the top mounting surface with a pair of apertures 28 spaced away from each side of the magnet. The frame 12 provides means whereby a number of lens members 14, such as reading lenses, distance lenses and sunblock lenses can be easily mounted to a single frame. A lens member 14 is comprised of a pair of lenses 34 with holes drilled in them for attachment at 32 to a flanged lens platform 30. The platform 30 has a mating magnetic element 24 with posts 26 located on each side of the magnet linearly conforming to the distance between the frame housing apertures 28. Once the magnets 22, 24 are aligned the posts 28 and apertures 28 prevent torsional forces from displacing the lens member 10, while maintaining the correct spacing between the user's eyes and lenses 34.

8 Claims, 8 Drawing Sheets

PRIMARY EYEGLASS LENSES MAGNETICALLY MOUNTABLE TO A FRAME

BACKGROUND OF THE INVENTION

1. Field of the Invention

The present invention relates generally to eyeglasses and, more specifically, to modular eyeglasses having a plurality of lens members that can be selectively mounted to a frame member.

The frame member has the typical temples and a crossbar with an interdisposed bridge. The bridge is formed of pad arms and nose pads depending from a mounting having a magnetic element fixed within the top mounting surface with a pair of apertures spaced away from each side of the magnet. The frame provides means whereby a number of lens members, such as reading lenses, distance lenses and sunblock lenses can be easily mounted to a single frame.

A lens member is comprised of a pair of lenses with holes drilled in them for attachment to a flanged lens platform. The platform has an opposing-poled magnetic element with posts located on each side of the magnet linearly conforming to the distance between the frame housing apertures. Once the magnets are aligned the posts and apertures prevent torsional forces from displacing the lens member, while maintaining the correct spacing between the user's eyes and lenses.

2. Description of the Prior Art

There are other eyeglass devices designed for attachment. Typical of these is U.S. Pat. No. 716,194 issued to Conn on Dec. 16, 1902.

Another patent was issued to Reichert on May 23, 1939 as U.S. Pat. No. 2,159,710. Yet another U.S. Pat. No. 2,737,847 was issued to Tesauro on Mar. 13, 1956 and still yet another was issued on Apr. 8, 1980 to Waldrop as U.S. Pat. No. 4,196,981.

Another patent was issued to Gazeley on Nov. 27, 1990 as U.S. Pat. No. 4,973,148. Yet another U.S. Pat. No. 5,416,537 was issued to Sadler on May 16, 1995. Another was issued to Chao on Oct. 22, 1996 as U.S. Pat. No. 5,568,207 and still yet another was issued on Jun. 24, 1997 to Nishioka as U.S. Pat. No. 5,642,177.

Another patent was issued to Chao on Apr. 7, 1998 as U.S. Pat. No. 5,737,054. Yet another U.S. Pat. No. 5,880,805 was issued to Naessens, et al. on Mar. 9, 1999. Another was issued to Chao, et al. on Jan. 11, 2000 as U.S. Pat. No. 6,012,811 and still yet another was issued on Apr. 25, 2000 to Ku as U.S. Pat. No. 6,053,611.

Another patent was issued to Ng on Nov. 5, 2002 as U.S. Pat. No. 6,474,810. Yet another U.S. Pat. No. 6,488,372 was issued to Park on Dec. 3, 2002. Another was issued to Ng on Dec. 30, 2000 as Canadian Patent No. CA2,276,699 and still yet another was issued on Apr. 6, 2001 to Zitsow as Canadian Patent No. CA2,285,142.

U.S. Pat. No. 716,194

Inventor: Lydia A. Conn

Issued: Dec. 16, 1902

A supplementary-lens attachment for spectacles or eyeglasses, consisting of a supplementary-lens mounting and a pair of hooks projecting therefrom, and disposed so as to vertically engage the nose-piece or other central portion of the main-lens mounting, substantially as specified.

U.S. Pat. No. 2,159,710

Inventor: Ellsworth Reichert

Issued: May 23, 1939

A lens mounting for cover glasses comprising a lens clamp, a bow-spring post integral with and extending from said clamp at one side thereof, permanent glass engaging means extending from said clamp on the side opposite said post, and a bow-spring having one end thereof connected to said post and freely rotatable thereon.

U.S. Pat. No. 2,737,847

Inventor: Nicholas Tesauro

Issued: Mar. 13, 1956

Means for selectively positioning supplemental lenses in operative and inoperative positions on spectacles including a frame having a pair of lenses supported thereby and temples pivotally secured to said frame, and wherein each of said supplemental lenses is provided with a magnetic piece adjacent an edge thereof; which comprises a magnetically attractive piece secured to each of said pair of lenses adjacent the lower edge thereof and on the vertical center line thereof for removably holding a supplemental lens on one or both of said spectacle lenses through the force of magnetic attraction, and said temples each being provided with a vertically disposed pocket opening through the upper edge thereof and being of a width substantially equal to the thickness of said supplemental lenses, and being of a depth for substantially concealing said lenses when disposed therein, and a magnetic piece disposed along an edge of each pocket for attracting the magnetically attractive metal piece on a supplemental lens disposed therein.

U.S. Pat. No. 4,196,981

Inventor: Jefferson P. Waldrop

Issued: Apr. 8, 1980

These eyeglasses consist primarily of a frame, in the bridge portion of which, is a cylindrical magnet that is received within a sleeve of ferrous metal. The sleeve structure includes a flat connecting member, which is rigidly secured to a lens supporting member, so as to enable the wearer to pivot the lenses upward, or downward, as desired.

U.S. Pat. No. 4,973,148

Inventor: Albert E. Gazeley

Issued: Nov. 27, 1990

There is disclosed an improved optical accessory of the sun shade type for use with a pair of prescription spectacles. The accessory includes releasable securing structure which releaseably cooperates with a bridge assembly of the spectacles to inhibit movement of the accessory relative thereto.

U.S. Pat. No. 5,416,537

Inventor: Frank Sadler

Issued: May 16, 1995

An eyeglass device is provided which includes frames adapted for fitting on and being supported by a human wearer's head. Primary lenses are set within the frames and have an external shape. The eyeglass device also has auxiliary lenses which have an external shape which generally corresponds to the external shape of the primary lenses. First magnetic members are attached to the frames, and second magnetic members are attached to the auxiliary lenses in positions which correspond to the positions of the first magnetic members in the frames. The second magnetic members are arranged for engagement with the first magnetic members to thereby secure the auxiliary lenses to the eyeglasses.

U.S. Pat. No. 5,568,207

Inventor: Richard Chao

Issued: Oct. 22, 1996

An eyeglass device includes a primary and an auxiliary spectacle frames for supporting lenses. The primary spectacle frame includes two legs pivotally coupled to two side extensions and includes two magnetic members secured in the rear and side portions. The auxiliary spectacle frame includes two legs engaged on the primary spectacle frame and each having a magnetic member for engaging with the magnetic members of the primary spectacle frame so as to secure the spectacle frames together and so as to prevent the auxiliary spectacle frame from moving downward relative to the primary spectacle frame.

U.S. Pat. No. 5,642,177

Inventor: Takahiro Nishioka

Issued: Jun. 24, 1997

Detachable sunglasses with magnets which are inexpensive, handled easily, not an obstacle when not in use stably attached, and not incongruous when used. Detachable templeless sunglasses comprises templeless sunglasses composed of sunglasses and a frame comprising a magnet to either end thereof, and eyeglasses composed of glasses and a frame comprising a magnet to either end thereof to make said templeless sunglasses detachable to said eyeglasses. The templeless sunglasses are provided with a hinge at the bridge of their frame to make them foldable.

U.S. Pat. No. 5,737,054

Inventor: Richard Chao

Issued: Apr. 7, 1998

An eyeglass device includes a primary and an auxiliary spectacle frames for supporting lenses. The primary spectacle frame includes a magnetic connector member secured in the middle bridge portion. The auxiliary spectacle frame includes a middle bridge portion having a projection for engaging over the middle bridge portion of the primary spectacle frame and having a magnetic connector member for engaging with the connector member of the primary spectacle frame such that the spectacle frames can be easily secured together with only one hand.

U.S. Pat. No. 5,880,805

Inventor: Jan Naessens, et al.

Issued: Mar. 9, 1999

The invention relates to a click-up, clip-on spectacles comprising a means for clipping the clip-on spectacles to a spectacle frame and bifocal lenses mounted in the clip-on spectacles. The bifocal lenses consist of two parts mounted one above the other and over the entire width of the spectacle glass, the upper part has a dioptre value of 0 and the lower part has a dioptre value of 1 or more. The upper part of each bifocal spectacle lens has a height of about two thirds of the overall height of the lens and the lower part of each bifocal spectacle lens has a height of roughly one third of the overall height of the spectacle lens. The bifocal lenses may be white or colored.

U.S. Pat. No. 6,012,811

Inventor: David Chao, et al.

Issued: Jan. 11, 2000

A first frame of an eyeglass device includes a bridge with a magnetic member, and two retaining mechanisms for supporting a pair of lenses. The retaining mechanisms define a frontal plane. The bridge ties the two retaining mechanisms together, with the magnetic member magnetically coupling to another magnetic member at the bridge of a second frame. In one embodiment the coupling occurs at a coupling surface on the second frame that is substantially perpendicular to the frontal plane. The magnetic member at the bridge of the first frame can be a permanent magnet or a magnetizable member. The second frame can be a primary frame, and the first frame can be an auxiliary frame.

U.S. Pat. No. 6,053,611

Inventor: Kuo-Hseng Ku

Issued: Apr. 25, 2000

A pair of auxiliary glasses with magnets in the present invention are provided with an upper and a lower against flanges which are backwardly protrudent on the bridge. Two magnets are respectively inserted in the upper and the lower against flanges, which are corresponding to each other. A pair of primary eyeglasses are provided with a magnet inserted in a proper position of the bridge. The bridge of the primary eyeglasses is capable of being inserted into the space between the upper and the lower against flanges of the bridge of the auxiliary glasses. Therefore, the auxiliary glasses can firmly attach to the primary eyeglasses not only by the function of the upper and the lower against flanges firmly clipping the bridge of the primary eyeglasses but also by the magnetic forces of the magnets.

U.S. Pat. No. 6,474,810

Inventor: David Ng

Issued: Nov. 5, 2002

An auxiliary spectacle apparatus is provided wherein auxiliary lenses have a mechanical bridge fastener for releasably engaging the bridge portion of the primary frames in a manner which provides security of attachment in all directions.

U.S. Pat. No. 6,488,372

Inventor: Hun-Yang Park

Issued: Dec. 3, 2002

A base and auxiliary eyeglass system having two bars for easy assembly and disassembly of the auxiliary eyeglasses and base eyeglasses. A first bar mounted on the base eyeglasses is equipped with magnets which interface with corresponding magnets on a second bar mounted on the auxiliary eyeglasses. The second bar has an L-shaped design permitting two necessary positions for the auxiliary glasses depending on which arm of the L-shaped second bar is aligned with the magnets on the first bar.

Canadian Patent Number 2,276,699

Inventor: Dave Ng

Issued: Dec. 30, 2000

An auxiliary spectacle apparatus is provided wherein the primary frame has securing portions located at positions proximal to its lateral ends and on the rear side of the primary frame, the auxiliary frame has a bridge fastener for releasably engaging the bridge portion and lateral fasteners for releasably engaging the securing portions, and magnets at positions between each lateral fastener and each securing portion.

Canadian Patent Number 2,285,142

Inventor: Arlene Zitsow

Issued: Apr. 6, 2001

An auxiliary spectacle apparatus is provided wherein the primary frame has securing portions located at positions proximal to its lateral ends and on the rear side of the primary frame, the auxiliary frame has a bridge fastener for releasably engaging the bridge portion and lateral fasteners for releasably engaging the securing portions, and magnets at positions between each lateral fastener and each securing portion.

While these eyeglasses may be suitable for the purposes for which they were designed, they would not be as suitable for the purposes of the present invention, as hereinafter described.

SUMMARY OF THE PRESENT INVENTION

The present invention discloses modular eyeglasses having a plurality of lens members that can be selectively mounted to a frame member. The frame member has the typical temples and a crossbar with an interdisposed bridge. The bridge is formed of pad arms and nose pads depending from a mounting having a magnetic element fixed within the top mounting surface with a pair of apertures spaced away from each side of the magnet. The frame provides means whereby a number of lens members, such as reading lenses, distance lenses and sunblock lenses can be easily mounted to a single frame. A lens member is comprised of a pair of lenses with holes drilled in them for attachment at to a flanged lens platform. The platform has a mating magnetic element with posts located on each side of the magnet linearly conforming to the distance between the frame housing apertures. Once the magnets are aligned the posts and apertures prevent torsional forces from displacing the lens member, while maintaining the correct spacing between the user's eyes and lenses.

A primary object of the present invention is to provide modular eyeglasses.

Another object of the present invention is to provide modular eyeglasses having a frame member and an attachable lens member.

Yet another object of the present invention is to provide modular eyeglasses wherein said frame is comprised of temples connected by a crossbeam having an interdisposed bridge element.

Still yet another object of the present invention is to provide modular eyeglasses wherein said bridge element is comprised of a mounting having a magnet and apertures positioned on opposing sides with pad arms and nose pads depending therefrom.

Another object of the present invention is to provide modular eyeglasses wherein said lens member is comprised of a pair of lenses having holes drilled therein for mounting a lens platform thereto.

Yet another object of the present invention is to provide modular eyeglasses wherein said lens platform has an opposing poled magnetic element with posts located on each side of the magnet linearly conforming to the distance between the frame housing apertures.

Still yet another object of the present invention is to provide modular eyeglasses wherein said frame member can have a plurality of mating lens members.

Another object of the present invention is to provide modular eyeglasses that reduces the cost of eyeglasses by having a single frame.

Additional objects of the present invention will appear as the description proceeds.

The present invention overcomes the shortcomings of the prior art by providing modular eyeglasses having a plurality of lens members that can be selectively mounted to a frame member.

The frame member has the typical temples and a crossbar with an interdisposed bridge. The bridge is formed of pad arms and nose pads depending from a mounting having a magnetic element fixed within the top mounting surface with a pair of apertures spaced away from each side of the magnet. The frame provides means whereby a number of lens members, such as reading lenses, distance lenses and sunblock lenses can be easily mounted to a single frame.

A lens member is comprised of a pair of lenses with holes drilled in them for attachment to a flanged lens platform. The platform has an opposing-poled magnetic element with posts located on each side of the magnet linearly conforming to the distance between the frame housing apertures. Once the magnets are aligned the posts and apertures prevent torsional forces from displacing the lens member, while maintaining the correct spacing between the user's eyes and lenses.

The foregoing and other objects and advantages will appear from the description to follow. In the description reference is made to the accompanying drawings, which form a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
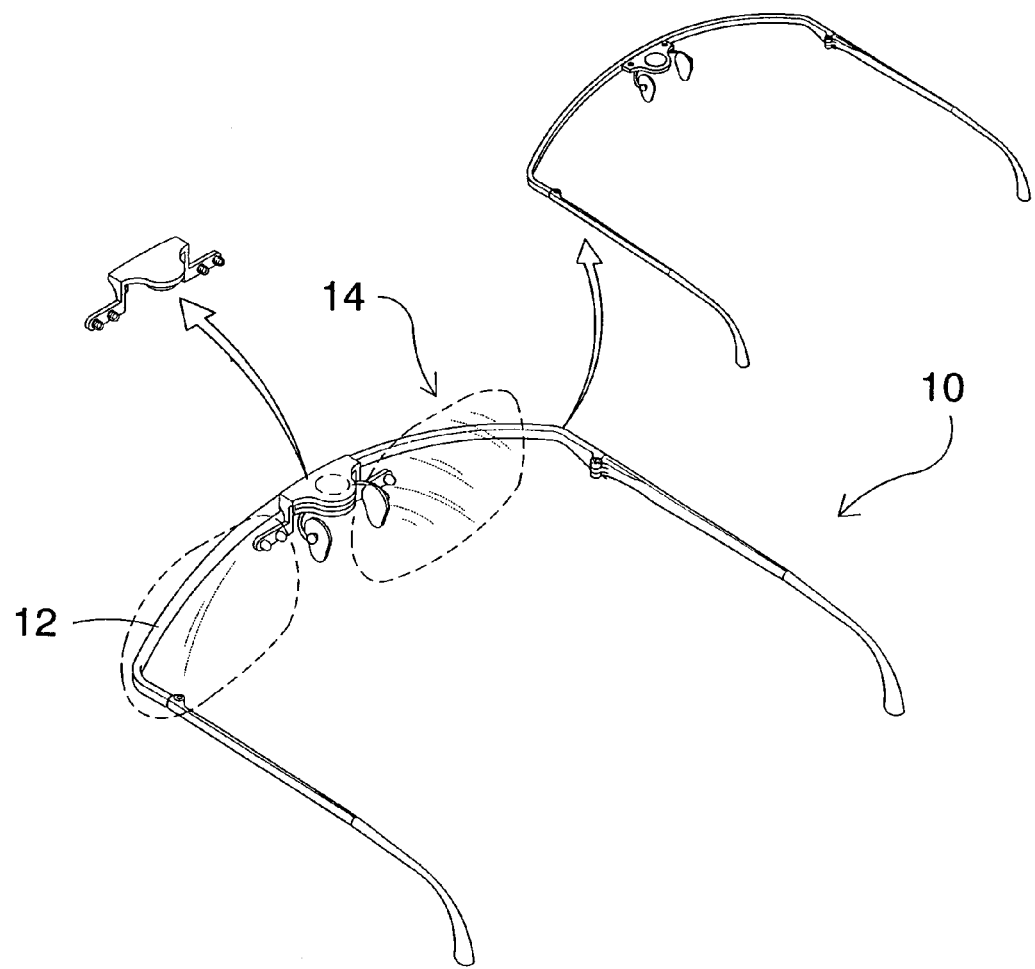
FIG. 1 is an illustrative view of the present invention.

With regard to reference numerals used, the following numbering is used throughout the drawings.
10 present invention
12 frame
14 lens member
16 temple arms
18 cross member
20 magnetic bridge
22 first magnet
24 second magnet
26 posts
28 pin/post aperture
30 lens magnetic bridge/platform
32 lens attaching element
34 lens
36 nose pad

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10. Shown is the present invention 10 comprising a frame 12 having temples and a crossbar with an interdisposed bridge. The bridge has the typical pad arms and nose pads depending from a housing having a magnetic element fixed within the top housing surface with a pair of apertures spaced away from each side of the magnet. The frame provides means whereby a number of lens members 14, such as reading lenses, distance lenses and sunblock lenses can be easily mounted to a single frame. A lens member 14 is comprised of a pair of lenses with holes drilled in them for attachment to a flanged lens platform. The platform has an opposing poled magnetic element with posts located on each side of the magnet linearly conforming to the distance between the frame housing apertures. Once the magnets are aligned the posts and apertures prevent torsional forces from displacing the lens member 14, while maintaining the correct spacing between the eyes and lenses.

Figure 2:
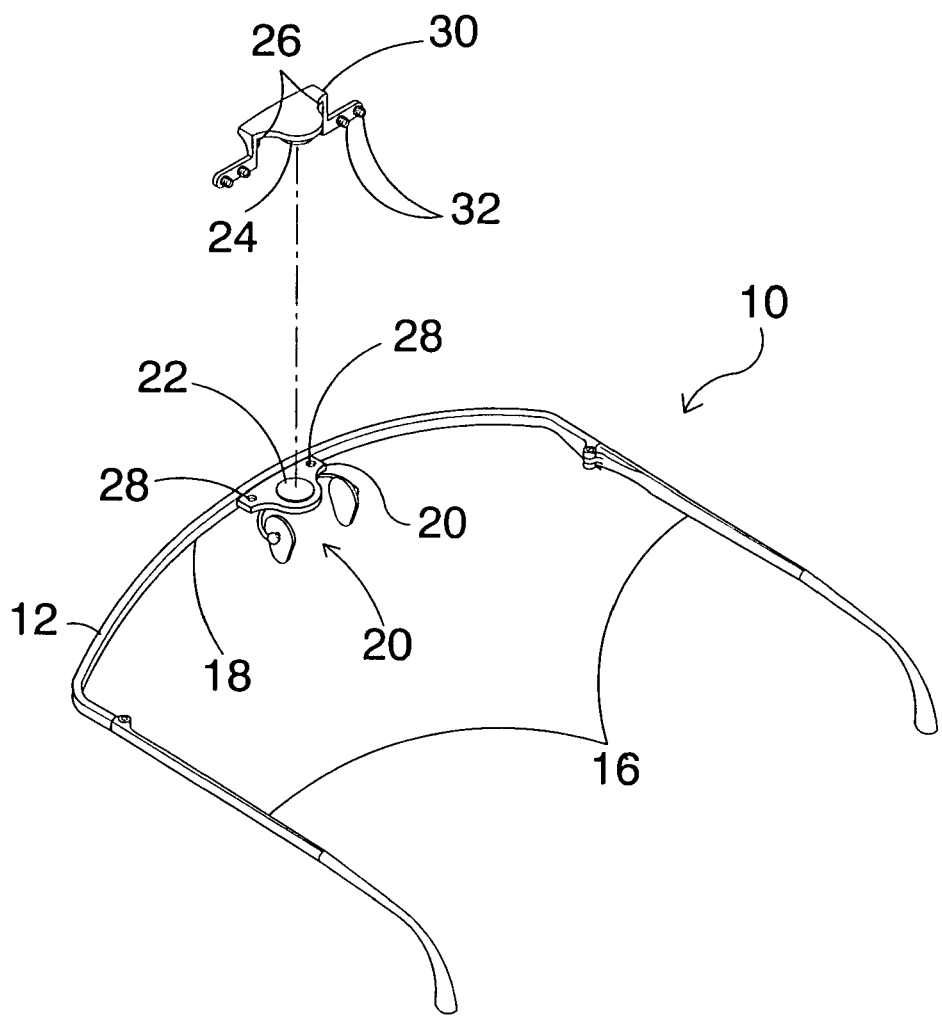
FIG. 2 is a perspective view of the components of the present invention.

Turning to FIG. 2, shown therein is a perspective view of the components of the present invention 10. Depicted is the present invention 10 comprising a frame member 12 and a lens member whereby a number of lens members can be produced using the same frame member. The frame has the temple arms 16 with a crossbeam 18 and a centrally positioned bridge mounting projection 20 having a first magnet 22 therein. The lens members are comprised of a pair of lenses with holes drilled in them for attachment to a flanged lens platform. The projection or platform 30 has an opposing poled second magnetic element 24 with posts 26 located on each side of the magnet linearly conforming to the distance between the frame housing pin apertures 28. Once the magnets 22, 24 are aligned the posts 26 and apertures 28 prevent torsional forces from displacing the lens member, while maintaining the correct spacing between the eyes and lenses. Also shown are the primary lens magnetic bridge projection 30 and lens attaching elements 32.

Figure 3:
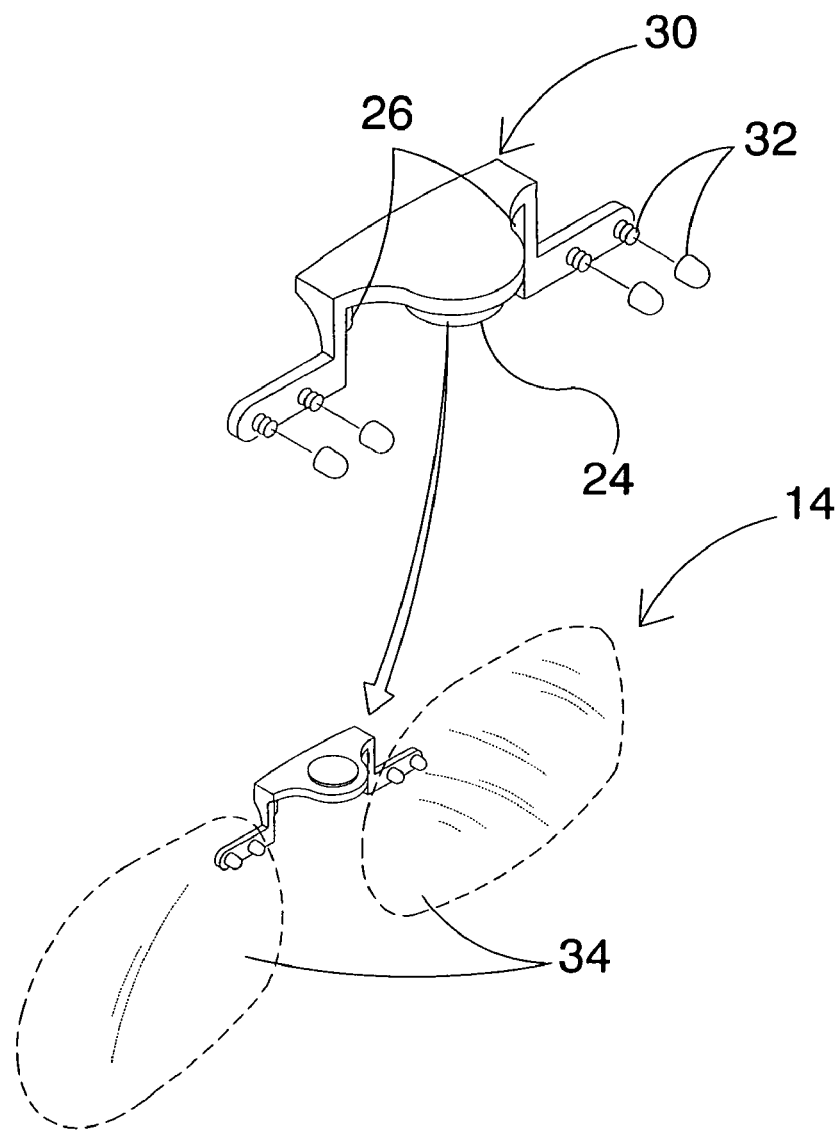
FIG. 3 is a perspective view of the lens member of the present invention.

Turning to FIG. 3, shown therein is a perspective view of the lens member 14 of the present invention. A lens member 14 is comprised of a pair of lenses 34 with holes drilled in them for attachment to a flanged lens platform 30. The platform 30 has an opposing poled magnetic element 24 with posts 26 located on each side of the magnet linearly conforming to the distance between the frame housing apertures. Once the magnets are aligned the posts 26 and apertures prevent torsional forces from displacing the lens member 14, while maintaining the correct spacing between the eyes and lenses. Also shown are the lens attaching elements 32 being a pin or protrusion with a cap on its end.

Figure 4:
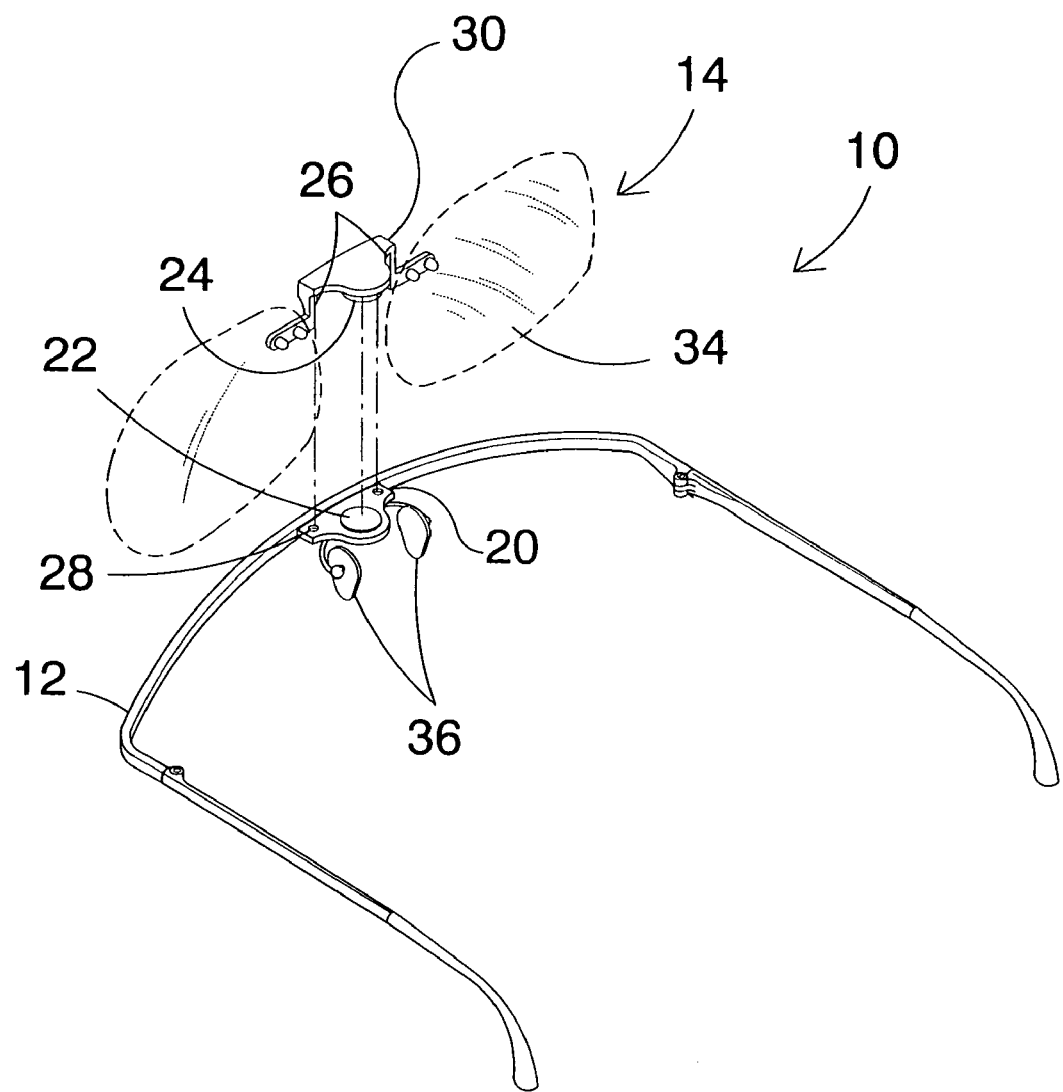
FIG. 4 is an exploded view of the present invention.

Turning to FIG. 4, shown therein is an exploded view of the present invention 10. Shown is the present invention 10 comprising a frame 12 having temples and a crossbar with an interdisposed magnetic bridge 20. The bridge 20 has the typical pad arms and nose pads 36 depending from a housing having a magnetic element 22 fixed within the top housing surface with a pair of apertures 28 spaced away from each side of the magnet. The frame provides means whereby a number of lens members 14, such as reading lenses 34, distance lenses and sunblock lenses can be easily mounted to a single frame. A lens member 14 is comprised of a pair of lenses 34 with holes drilled in them for attachment to a flanged lens platform 30. The platform 30 has an opposing poled magnetic element 24 with posts 26 located on each side of the magnet linearly conforming to the distance between the frame housing apertures. Once the magnets 22, 24 are aligned the posts 26 and apertures 28 prevent torsional forces from displacing the lens member 14, while maintaining the correct spacing between the eyes and lenses 34.

Figure 5:
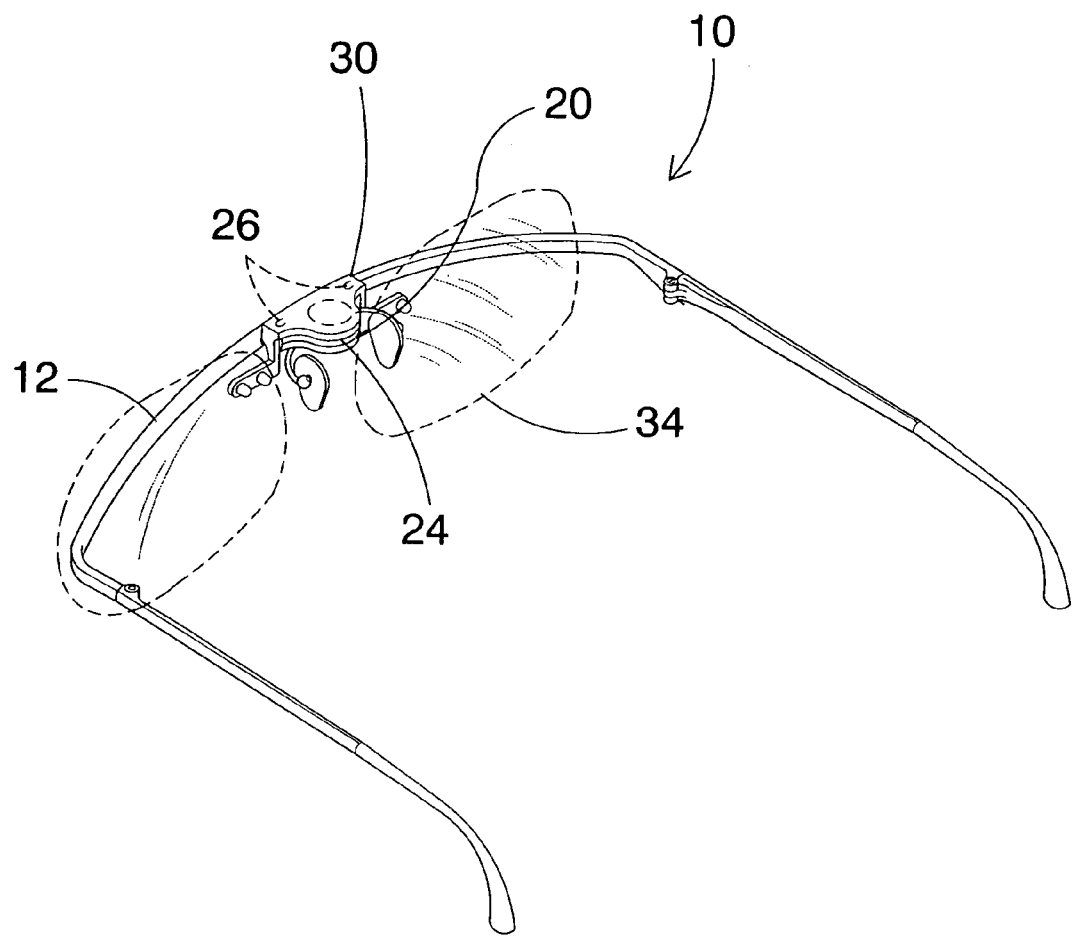
FIG. 5 is an assembled perspective view of the present invention.

Turning to FIG. 5, shown therein is an assembled perspective view of the present invention 10. Illustrated is the present invention 10 assembled for use. The modular eyeglasses is comprised of a frame member 12 and a plurality of lens members that can be used with the same frame member. The frame 12 has the temple arms with a crossbeam and a centrally positioned bridge mounting 20 having a magnet 22 therein. The lens members is comprised of a pair of lenses 34 with holes drilled in them for attachment to a flanged lens platform 30. The platform 30 has an opposing poled magnetic element 24 with posts 26 located on each side of the magnet linearly conforming to the distance between the frame housing apertures. Once the magnets are aligned the posts and apertures prevent torsional forces from displacing the lens member, while maintaining the correct spacing between the eyes and lenses 34.

Figure 6:
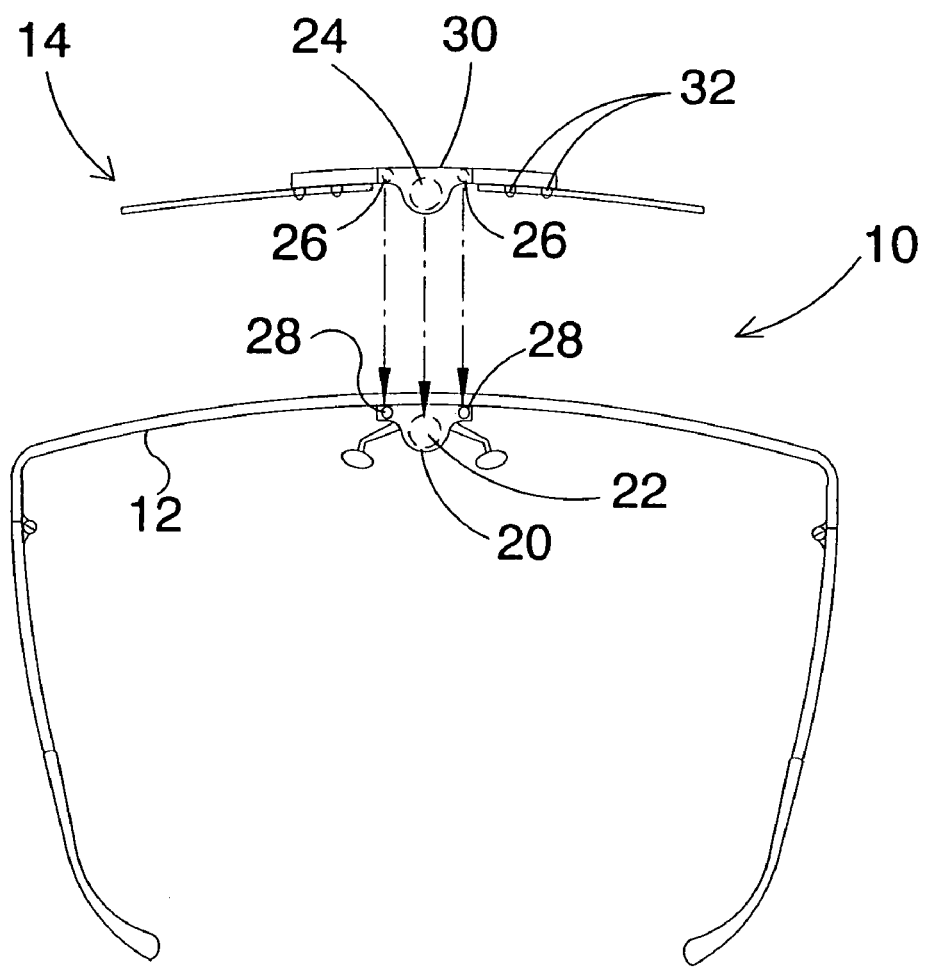
FIG. 6 is a top view of the present invention.

Turning to FIG. 6, shown therein is a top view of the present invention 10. Shown is the present invention 10 comprising a frame 12 having temples and a crossbar with an interdisposed magnetic bridge 20. The bridge 20 has the typical pad arms and nose pads depending from a housing having a magnetic element fixed within the top housing surface with a pair of apertures 28 spaced away from each side of the magnet 22. The frame 12 provides means whereby a number of lens members 14, such as reading lenses, distance lenses and sunblock lenses can be easily mounted to a single frame. A lens member 14 is comprised of a pair of lenses with holes drilled in them for attachment at 32 to a flanged lens platform 30. The platform 30 has an opposing poled magnetic element 24 with posts 26 located on each side of the magnet linearly conforming to the distance between the frame housing apertures 28. Once the magnets 22, 24 are aligned the posts 26 and apertures 28 prevent torsional forces from displacing the lens member 14, while maintaining the correct spacing between the eyes and lenses.

Figure 7:
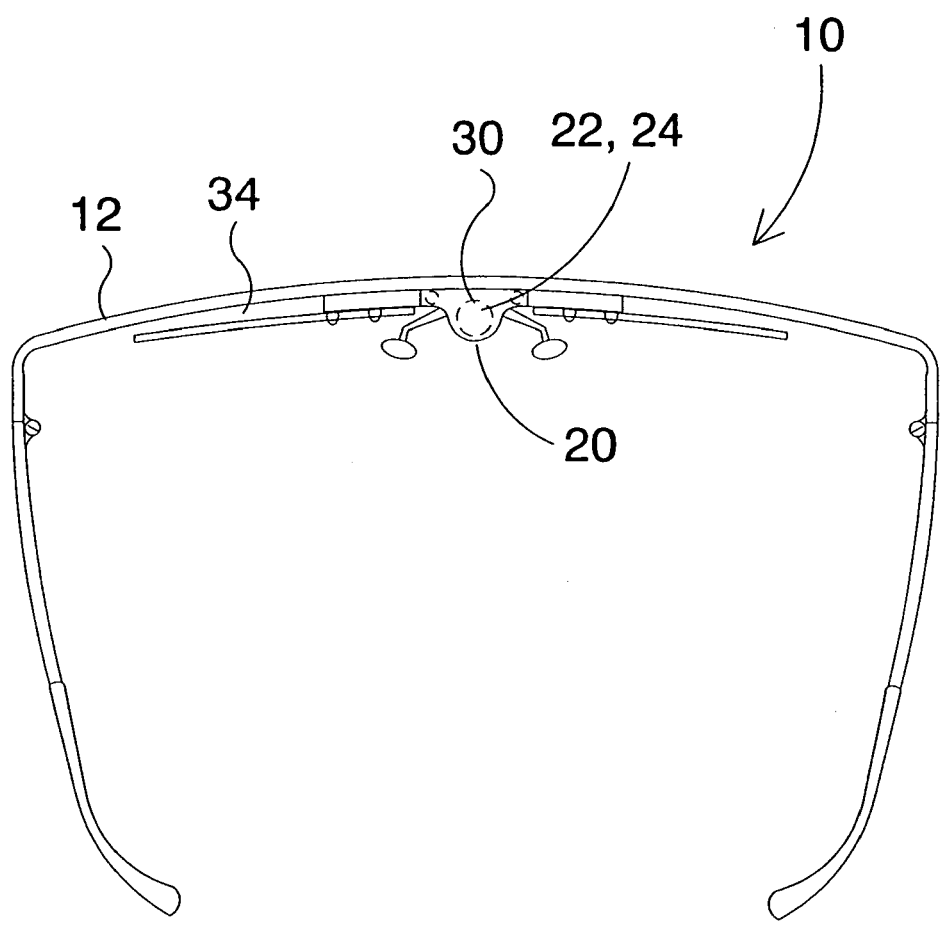
FIG. 7 is an assembled top view of the present invention.

Turning to FIG. 7, shown therein is an assembled top view of the present invention 10. Illustrated is the present invention 10 assembled for use. The modular eyeglasses are comprised of a frame member 12 and a plurality of lens members with lens 34 that can be used with the same frame member. The frame 12 has the temple arms with a crossbeam and a centrally positioned bridge 20 mounting having a magnet therein. The lens member is comprised of a pair of lenses with holes drilled in them for attachment to a flanged lens platform 30. The platform 30 has an opposing poled magnetic element with posts located on each side of the magnet linearly conforming to the distance between the frame housing apertures. Once the magnets 22, 24 are aligned the posts and apertures prevent torsional forces from displacing the lens member, while maintaining the correct spacing between the eyes and lenses 34.

Figure 8:
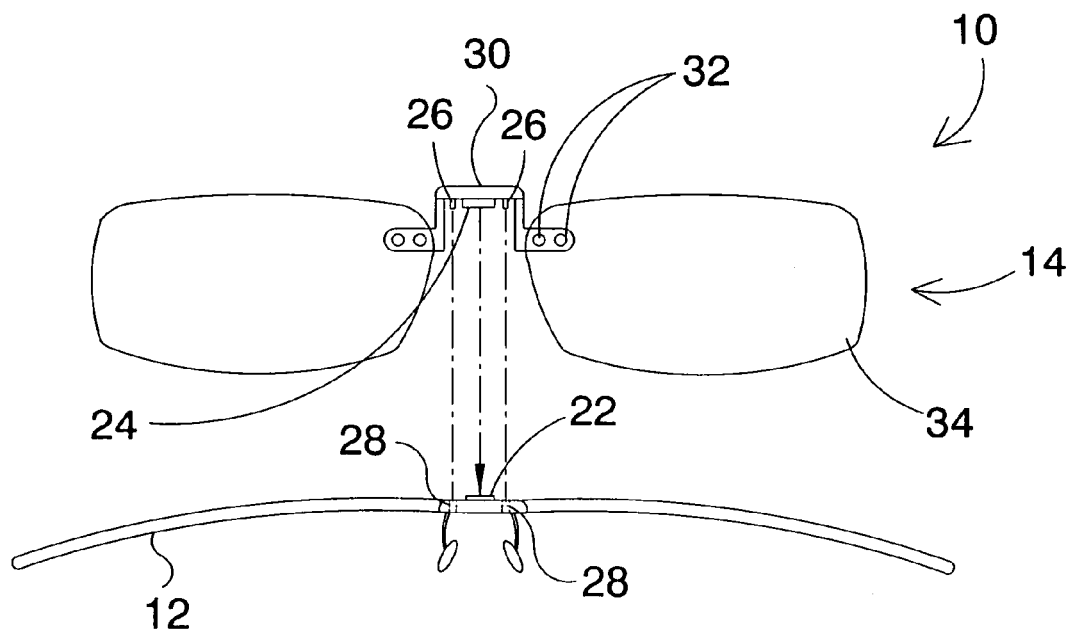
FIG. 8 is a view of the present invention.

Turning to FIG. 8, shown therein is a view of the present invention 10. Depicted is the present invention 10 comprising a frame member 12 and a lens member 14 whereby a number of lens members can be produced using the same frame member. The frame 12 has the temple arms with a crossbeam and a centrally positioned bridge mounting having a magnet 22 therein. The lens member 14 is comprised of a pair of lenses 34 with holes drilled in them for attachment at 32 to a flanged lens platform 30. The platform 30 has an opposing poled magnetic element 24 with posts 26 located on each side of the magnet linearly conforming to the distance between the frame housing apertures 28. Once the magnets 22, 24 are aligned the posts 26 and apertures 28 prevent torsional forces from displacing the lens member 14, while maintaining the correct spacing between the eyes and lenses 34.

I claim:

1. An apparatus for eyeglasses formed by magnetically coupling a lens member to a frame member, comprising:
   a) a frame having left and right portions connected by a nose bridge portion and having left and right temple arms for connection to the ears of a user, said nose bridge portion having a front and rear, a top and bottom, and left and right sides;
   b) left and right nose pads being disposed on said nose bridge portion to permit the frame to be supported on the nose of the user;
   c) a first magnet being disposed on said top of said nose bridge portion;
   d) a lens member having left and right lens corresponding to a left and right eye of a user, said left and right lens being connected by a lens bridge having a front and rear, a top and bottom, and left and right sides;
   e) means for connecting said left and right lens to said lens bridge whereby the left and right lens are secured to the lens bridge; and,
   f) a second magnet being disposed on said bottom of said lens bridge, wherein said second magnet mates to said first magnet wherein said lens member is connected to said frame to form eyeglasses, wherein said nose bridge portion further comprises a first planar projection disposed on said rear of said nose bridge portion, said first planar projection having a first and second aperture therein, wherein said first aperture is disposed on said left side of said first projection and said second aperture is disposed on said right side of said first projection, wherein said first magnet is disposed on said top of said first projection, wherein said lens bridge further comprises a second planar projection disposed on said rear of said lens bridge, wherein said second planar projection has a first and second post extending downwardly on said bottom side thereof, wherein said first and second posts correspond to and extend into said first and second apertures on said first planar projection so that said lens member can be secured to said frame.

2. The apparatus of claim 1, wherein said means for connecting said left and right lens to said lens bridge, comprises:
   a) wherein each of said left and right lens has a front and rear and a top and bottom portion, and wherein each of said left and right lens has at least one hole therein;
   b) wherein said hole is disposed on said top portion of each said lens, said hole passing entirely through each said lens from said front to said rear of each said lens;
   c) at least one protrusion being disposed on said lens bridge, wherein said protrusion extends to said rear of said lens bridge and is disposed on each of said left and right sides of said lens bridge corresponding spatially to said hole in each of said left and right lens so as to mate with and extend into each said hole, each said protrusion having an end; and,
   d) a cap being disposed on said end of each said protrusion for attaching each said lens to said lens bridge.

3. The apparatus of claim 2, wherein there are a pair of said holes in each of said lens.

4. The apparatus of claim 3, wherein each of said left and right nose pads is connected to said nose bridge portion by an arm.

5. The apparatus of claim 4, wherein a plurality of different said lens members can be mounted on the same said frame.

6. The apparatus of claim 5, wherein said lens member contains reading lens.

7. The apparatus of claim 6, wherein said lens member contains distance vision lens.

8. The apparatus of claim 5, wherein said lens member contains sun block lens.

* * * * *